United States Patent Office 3,637,736
Patented Jan. 25, 1972

3,637,736
N'-SUBSTITUTED-6-NITROINDAZOLES
Pasquale P. Minieri, Woodside, N.Y., assignor to
Tenneco Chemicals, Inc.
No Drawing. Filed Oct. 25, 1966, Ser. No. 589,235
Int. Cl. C07d 49/18
U.S. Cl. 260—310 C
2 Claims

ABSTRACT OF THE DISCLOSURE

N'-Substituted-6-nitroindazoles are useful in the control of the growth of undesirable fungi, bacteria, plants and insects. Among hte most active of these compounds are N'-thiocyanatomethyl-6-nitroindazole and N'-chloromethyl-3-chloro-6-nitroindazole.

---

This invention relates to novel biocidal compositions and to their use in the control of various plant and animal pests. More particularly, it relates to the control of the growth of undesirable fungi, bacteria, plants, and insects using pesticidal compositions that contain N'-substituted-6-nitroindazoles as their biocidally-active ingredients.

In accordance with this invention, it has been discovered that certain N'-substituted-6-nitroindazoles have unusual and valuable activity as fungicides, bactericides, insecticides, and selective herbicides. These compounds may be represented by the structural formula

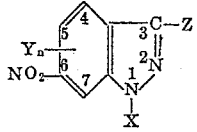

wherein X represents a member selected from the group consisting of

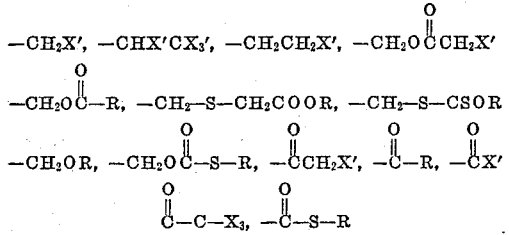

—R, —SR, —SCX'$_3$, —SCX'$_2$CHX'$_2$, —SO$_2$R, and —SO$_2$CX'$_3$; X' represents a member selected from the group consisting of —OH, —OR, —SCN, —Cl, —Br, —F, and —I; R represents a member selected from the group consisting of alkyl groups having 1 to 12 carbon atoms, haloalkyl groups having 1 to 4 carbon atoms, phenyl, chlorophenyl, hydroxyphenyl, alkylphenyl, and nitrophenyl; Y represents a member selected from the group consisting of alkyl groups having from 1 to 4 carbon atoms, —Cl, —Br, —F, —I, and —NO$_2$; Z represents a member selected from the group consisting of —H, —Cl, —Br, —F, and —I; and n represents an integer in the range of zero to two. The preferred compounds for use in pesticidal compositions are those in which n is zero and Z represents hydrogen or chlorine.

Illustrative of the pesticidal compounds of this invention are the following:

N'-hydroxymethyl-6-nitroindazole,
N'-chloromethyl-6-nitroindazole,
N'-carbothioethoxy-6-nitroindazole,
N'-chloroacetyl-6-nitroindazole,
N'-trichloromethylmercapto-6-nitroindazole,
N'-tetrachloroethylmercapto-6-nitroindazole,
N'-thiocyanatomethyl-6-nitroindazole,
N'-hydroxymethyl-3-chloro-6-nitroindazole,
N'-bromomethyl-3-chloro-6-nitroindazole,
N'-dichlorofluoromethylmercapto-3-chloro-6-nitroindazole,
N'-trichloromethylmercapto-3-chloro-6-nitroindazole,
N'-thiocyanatomethyl-3-chloro-6-nitroindazole,
N'-carbothioethoxy-3-chloro-6-nitroindazole,
N'-trichloromethylmercapto-5,6-dinitroindazole,
N'-chloromethyl-3-chloro-5,6-dinitroindazole,
N'-trichloromethylmercapto-4-iodo-6-nitroindazole,
N'-trichloromethylmercapto-3,4-dichloro-6-nitroindazole,
N'-hydroxymethyl-3-bromo-6-nitroindazole,
N'-hydroxymethyl-3-iodo-6-nitroindazole,
N'-hydroxyethyl-4-methyl-6-nitroindazole, and the like.

A single N'-substituted-6-nitroindazole or a mixture of two or more of these compounds may be present in the pesticidal compositions of this invention.

The novel N'-substituted-6-nitroindazoles may be prepared by any suitable and convenient procedure. For example, 6-nitroindazole or a 3-halo-6-nitroindazole may be heated as such or as an N'-amine salt with a compound that will react with it to form the desired N'-substituted-6-nitroindazole. Thus, 6-nitroindazole or 3-chloro-6-nitroindazole may be heated with paraformaldehyde to form the corresponding N'-hydroxymethyl compounds or with trichloromethylsulfenyl chloride to form the corresponding N'-trichloromethylmercapto compounds. The reaction is generally carried out in a solvent, such as benzene, toluene, xylene, acetone, pyridine, ethanol, or ethylene dichloride, at the reflux temperature of the reaction mixture.

The biocidal compositions of this invention may be applied to a wide variety of fungi, bacteria, plants, insects, and other pests to control or inhibit their growth. While each of the N'-substituted-6-nitroindazoles has been found to be useful in the control of the growth of at least one of the aforementioned types of organisms, the particular pest upon which each exerts its major effect is largely dependent upon the nature of the substituents on the rings. For example, N'-trichloromethylmercapto-6-nitroindazole, N'-hydroxymethyl-6-nitroindazole, and N'-thiocyanatomethyl-6-nitroindazole are most effective as agricultural and industrial fungicides, while N'-chloroacetylmethyl-6-nitroindazole and N'-(3,4-dichlorobenzoyl)-6-nitroindazole are selective herbicides and N'-carbothioethoxy-6-nitroindazole is useful as an insecticide.

The locus in which pest control is to be effective may, if desired, be treated with the compounds of this invention. Alternatively, the compounds may be applied directly to the undesirable organisms to control or inhibit their growth.

While the N'-substituted-6-nitroindazoles may be used as such in the process of this invention, they are usually and preferably used in combination with an inert carrier that facilitates the dispensing of dosage quantities of the pesticide and assists in its absorption by the organism whose growth is to be controlled. The pesticidal compounds may be mixed with or deposited upon inert particulate solids, such as fullers earth, talc, diatomaceous earth, hydrated calcium silicate, kaolin, and the like, to form dry particulate compositions. Such compositions may, if desired, be dispersed in water with or without the aid of a surface-active agent. The pesticidal compounds are preferably dispensed in the form of solutions or dispersions in inert organic solvents, water, or mixtures of inert organic solvents and water or as oil-in-water emulsions. The concentration of the pesticide in the compositions may vary within wide limits and depends upon a number of factors, the most important of which are the type or types of organisms being treated and the rate at which the composition is to be applied. In most cases the composition contains approximately 0.1% to 85% by weight of one or more of the aforementioned N'-substituted-6-nitroindazoles. If desired, the compositions may contain other fungicides, such as sulfur, the metal dimethyl dithiocarbamates, and the metal ethylene bis (dithiocarbamates); insecticides, such as Chlordane, benzene hexachloride, and DDT; or plant nutrients, such as urea, ammonium nitrate, and potash.

The amount of the composition used is that which will bring about satisfactory control of the growth of the organism. To achieve control of fungi, insects, and bacteria, for example, an amount of the composition that is used is that which will apply to the locus or to the organism about 50 p.p.m. to 10,000 p.p.m. of the active compound since these amounts will ordinarily control the pest without injuring plants. Herbicidal compositions are generally used in amounts that will apply about 1 pound to 20 pounds of the active compound per acre.

The invention is further illustrated by the examples that follow.

EXAMPLE 1

To a mixture of 28.5 grams of 6-nitroindazole, 17.7 grams of triethylamine, and 250 ml. of benzene which was being heated at its reflux temperature was added over a period of 40 minutes 34.4 grams of trichloromethanesulfenyl chloride. The resulting mixture was heated at its reflux temperature for 2.5 hours, cooled to room temperature, and filtered. The filtrate was washed with two 100 ml. portions of water and then heated to remove the benzene. After crystallization from ligroin, there was obtained 31 grams of N'-trichloromethylmercapto-6-nitroindazole which melted at 105°–9° C. and which contained 33.3% Cl (calculated for $C_8H_4N_3O_2Cl_3$, 34.1% Cl).

EXAMPLE 2

A mixture of 41 grams of 6-nitroindazole, 11.3 grams of paraformaldehyde, 200 ml. of ethanol, and 2.3 ml. of 5% aqueous sodium hydroxide solution was heated at its reflux temperature for 2.25 hours, filtered hot, and cooled to room temperature. The solid product was isolated by filtration, washed with cold ethanol, and dried under vacuum at 160° C. There was obtained 33.5 grams of N'-hydroxymethyl-6-nitroindazole, which melted at 157°–60° C. and which contained 21.1% N (calculated for $C_8H_7N_3O_3$, 21.8% N).

EXAMPLE 3

A mixture of 30 grams of N'-hydroxymethyl-6-nitroindazole, 39 grams of thionyl chloride, and 350 ml. of ethylene dichloride was heated at its reflux temperature for five hours. After removal of the solvent, the product was recrystallized from ethylene dichloride. The N'-chloromethyl-6-nitroindazole obtained melted at 163°–8° C. and contained 20.0% N (calculated for $C_8H_6N_3O_2Cl$, 19.9% N).

EXAMPLE 4

A mixture of 30 grams of N'-chloromethyl-6-nitroindazole, 13.8 grams of potassium thiocyanate, and 450 ml. of acetone was heated to its reflux temperature and filtered hot. The filtrate was cooled to room temperature, filtered, and then heated to remove the acetone. There was obtained 34 grams of N'-thiocyanatomethyl-6-nitroindazole which melted at 116°–22° C. and which contained 22.1% N (calculated for $C_9H_6N_4O_2S$, 23.1% N).

EXAMPLE 5

To a mixture of 32.6 grams (0.2 mole) of 6-nitroindazole, 20.2 grams (0.2 mole) of triethylamine, and 400 ml. of benzene which had been heated to its reflux temperature was added over a period of one hour 22.6 grams (0.2 mole) of chloroacetyl chloride. The mixture was heated at its reflux temperature for 1.5 hours and then filtered while hot. The filtrate was heated at atmospheric pressure to remove the benzene, and the resulting solid product was crystallized from chloroform and dried. There was obtained 34 grams of N'-chloroacetyl-6-nitroindazole which melted at 143°–46° C. and which contained 17.6% N and 14.8% Cl (calculated for $C_9H_6ClN_3O_3$, 17.5% N and 14.8% Cl).

EXAMPLE 6

A mixture of 43.3 grams (0.18 mole) of N'-chloroacetyl-6-nitroindazole, 17.6 grams (0.18 mole) of potassium thiocyanate, and 300 ml. of acetone was heated at its reflux temperature (59° C.) for two hours, cooled to room temperature, allowed to stand for 48 hours, and then filtered. There was obtained 37.2 grams of N'-thiocyanatoacetyl-6-nitroindazole, which melted at 137°–39° C. and which contained 21.4% N and 12.2% S (calculated for $C_{10}H_6N_4O_3S$, 20.8% N and 12.3% S).

EXAMPLE 7

To a mixture of 34.8 grams (0.175 mole) of 3-chloro-6-nitroindazole, 17.7 grams (0.175 mole) of triethylamine, and 250 ml. of benzene which was being heated at its reflux temperature was added over a period of 40 minutes 34.4 grams (0.175 mole) of trichloromethanesulfenyl chloride. The resulting mixture was heated at its reflux temperature for 2.5 hours, cooled to room temperature, and filtered. The filtrate was washed with three 100 ml. portions of water and then heated to remove the benzene. Upon recrystallization from ethanol, there was obtained 33.5 grams of N' - trichloromethylmercapto-3-chloro-6-nitroindazole, which melted at 133°–36° C. and which contained 12.6% N and 40.2% Cl (calculated for $C_8H_3N_3O_2Cl_4$, 12.1% N and 40.9% Cl).

EXAMPLES 8–23

The following N'-substituted-6-nitroindazoles were prepared by the procedures set forth in Examples 1–7:

| Example Number | Compound | Melting range (° C.) | Cl | S | N |
|---|---|---|---|---|---|
| 8 | N'-(2,2,2-trichloro-1-hydroxyethyl)-6-nitroindazole | 176–79 | | | |
| 9 | N'(trichloromethylsulfonyl)-6-nitroindazole | 177–78 | | | |
| 10 | N'-chloroacetoxymethyl-6-nitroindazole | 157–60 | 13.4 (13.1) | | |
| 11 | N'thiocyanatoacetoxymethyl-6-chloronitroindazole | 139–41 | | 11.3 (11.0) | |
| 12 | N'-methoxymethyl-6-nitroindazole | 57–62 | | | 18.7 (20.3) |
| 13 | N'-(3,4-dichlorobenzoyl)-6-nitroindazole | 236–39 | 21.1 (21.1) | | 12.8 (12.5) |
| 14 | N'-(p-toluenesulfonyl)-6-nitroindazole | 195–201 | | 10.1 (10.1) | 13.1 (13.2) |
| 15 | N'-salicoyl-6-nitroindazole | 170–76 | | | 20.5 (14.9) |
| 16 | N'carbothioethoxy-6-nitroindazole | 118–40 | | 13.7 (12.7) | 16.6 (16.7) |
| 17 | N'-(1,2,2,2-tetrachloroethylmercapto)-6-nitroindazole | 177–80 | | | |
| 18 | N'phenoxymethyl)-6-nitroindazole | | | | 16.0 (15.6) |
| 19 | N'-(p-nitrophenoxymethyl)-6-nitroindazole | 206–206.5 | | | 17.9 (17.9) |
| 20 | N'-dodecyl-6-nitroindazole | 50–53 | | | 13.0 (12.6) |
| 21 | N'-(2-hydroxyethyl)-6-nitroindazole | 100–104 | | | 20.4 (20.3) |
| 22 | N'-(2-chloroethyl)-6-nitroindazole | 85–100 | | | 20.8 (20.3) |
| 23 | N'-(2-thiocyanatoethyl)-6-nitroindazole | 144–64 | | | 18.9 (18.7) |
| 24 | N'-(m-nitrophenyl-sulfonyloxymethyl)-6-nitroindazole | 159–60 | | 6.9 (9.2) | 15.4 (16.1) |
| 25 | N'-(trichlorotoluenesulfonyloxymethyl)-6-nitroindazole | 200–30 | | 5.2 (7.1) | 11.7 (9.3) |
| 26 | N'-(3,4-dichlorobenzoyloxmethyl)-6-nitroindazole | 142–45 | 20.4 (19.4) | | 11.4 (11.5) |

| Example Number | Compound | Melting range (°C.) | Analysis (calculated), percent | | |
|---|---|---|---|---|---|
| | | | Cl | S | N |
| 27 | N'-(2-hydroxy-1,1,1,3,3,3-hexafluoroisopropyl)-6-nitroindazole | | | | 24.0 (17.8) |
| 28 | N'-trifluoroacetyl-6-nitroindazole | | | | |
| 29 | Carboethoxymethyl-N'(6-nitroindazolylmethyl) sulfide | 173-80 | | 12.3 (10.8) | 14.5 (14.2) |
| 30 | O-ethyl-S,N'-(6-nitroindazoyl)methyldithiocarbonate | | | | |
| 31 | N'-hydroxymethyl-3-chloro-6-nitroindazole | 152-54 | 15.5 (15.6) | | 18.1 (18.5) |
| 32 | N'-chloromethyl-3-chloro-6-nitroindazole | 157-59 | 28.3 (28.8) | | 17.3 (17.2) |
| 33 | N'-(3-chloro-6-nitroindazolyl)methyl ethyl thiocarbonate | 81-82.5 | 11.3 (11.2) | 10.1 (10.2) | 13.4 (13.3) |
| 34 | N'-carbothioethoxy-3-chloro-6-nitroindazole | 123-26 | 12.4 (12.4) | 11.4 (11.2) | 14.6 (14.7) |
| 35 | Carboethoxymethyl-N'-(3-chloro-6-nitroindazolyl methyl sulfide | 88.5-90 | 11.1 (10.8) | 10.0 (9.7) | 13.2 (12.7) |
| 36 | O-ethyl-S,N'-(3-chloro-6-nitroindazolyl) methyl dithiocarbonate | | 10.7 (10.7) | 19.9 (19.2) | 19.4 (12.6) |
| 37 | N'-chloroacetyl-3-chloro-6-nitroindazole | 202-04 | 20.2 (18.0) | | 21.2 (21.3) |
| 38 | N'-carbothiophenoxy-3-chloro-6-nitroindazole | 193-94 | 11.0 (10.0) | 9.4 (9.5) | 13.0 (12.6) |

EXAMPLE 39

Acetone solutions were prepared by dissolving 100 mg. portions of the products of Examples 1–38 in 10 ml. of acetone that contained 2000 p.p.m. of sorbitan trioleate (Span 85) and 5000 p.p.m. of a polyoxyethylene ether of sorbitan monooleate (Tween 80). The acetone solutions were dispersed in 90 ml. portions of distilled water to form aqueous solutions that contained 1000 p.p.m. of the N'-substituted-6-nitroindazole. More dilute solutions were prepared by adding distilled water to these solutions.

EXAMPLE 40

Cheyenne wheat plants that were 6–8 inches tall were sprayed until the liquid dripped from the plants with an aqueous solution of an N'-substituted-6-nitroindazole which had been prepared by the procedure of Example 39. When the plants had dried, they were sprayed with a suspension of spores of wheat leaf rust disease *Puccinia rubigo-vera*. Ten days after treatment the degree of suppression of the disease was noted. The following results were obtained.

| Example number | Fungicide | Concentration of fungicide in solution, p.p.m. | Percent control of wheat leaf rust | Phytotoxicity |
|---|---|---|---|---|
| A | N'-trichloromethylmercapto-6-nitroindazole | 1,000 | 96 | None. |
| B | N'-hydroxymethyl-6-nitroindazole | 1,000 | 91 | Do. |
| C | N'-chloromethyl-3-chloro-6-nitroindazole | 1,000 | 89 | Do. |

EXAMPLE 41

Tomato plants that were 6–8 inches tall were sprayed until the liquid dripped from the leaves with aqueous solutions prepared by the procedure of Example 39. When the plants had dried, they were sprayed with a suspension of spores of the tomato late blight fungus *Phytophthora infestans*. One week after treatment the degree of suppression of the disease was noted. The following results were obtained:

| Example Number | Fungicide | Concentration of fungicide in solution, p.p.m. | Percent control of late blight of tomatoes | Phytotoxicity |
|---|---|---|---|---|
| A | N'-trichloromethylmercapto-6-nitroindazole | 100 | 100 | None. |
| | | 10 | 80 | Do. |
| B | N'-hydroxymethyl-6-nitroindazole | 100 | 100 | Do. |
| C | N'-thiocyanatomethyl-6-nitroindazole | 250 | 94 | Do. |
| D | N'-methoxymethyl-6-nitroindazole | 1,000 | 100 | Slight. |
| E | N'-thiocyanatoacetoxymethyl-6-nitroindazole | 1,000 | 96 | None. |
| | | 50 | 65 | Do. |
| F | N'-hydroxymethyl-3-chloro-6-nitroindazole | 100 | 92 | Slight. |
| G | N'-chloromethyl-3-chloro-6-nitroindazole | 250 | 100 | Slight. |
| | | 63 | 86 | None. |
| H | N'-thiocyanatomethyl-3-chloro-6-nitroindazole | 1,000 | 76 | Do. |

EXAMPLE 42

Cucumber plants that were 6–8 inches tall were sprayed until the liquid dripped from the plants with aqueous solutions prepared by the procedure of Example 39. When the plants had dried, they were sprayed with a suspension of spores of powdery mildew disease *Erypiphe cichoracearum*. Ten days after treatment the degree of suppression of disease was noted. The following results were obtained:

| Example number | Fungicide | Concentration of fungicide in aqueous solution, p.p.m. | Percent control of powdery mildew of cucumber | Phytotoxicity |
|---|---|---|---|---|
| A | N'-trichloromethylmercapto-6-nitroindazole | 1,000 | 89 | Slight. |
| B | N'-hydroxymethyl-3-chloro-6-nitroindazole | 300 | 92 | Moderate. |
| C | N'-chloromethyl-3-chloro-6-nitroindazole | 1,000 | 89 | None. |
| D | N'-carbothioethoxy-3-chloro-6-nitroindazole | 1,000 | 100 | Do. |

EXAMPLE 43

Aqueous solutions prepared according to the procedure of Example 39 were applied to samples of soil infested with *Pythium aphanidermatum*. Ten days after treatment the degree of suppression of this disease was noted. The following results were obtained:

| Example Number | Fungicide | Concentration of fungicide in aqueous solution, p.p.m | Percent control of *P. aphanidermatum* | Phytotoxicity |
|---|---|---|---|---|
| A | N'-methoxymethyl-6-nitroindazole | 1,000 | 75 | None. |
| B | N'-trichloromethylmercapto-6-nitroindazole | 100 | 86 | Do. |
| C | N'-thiocyanatomethyl-6-nitroindazole | 100 | 83 | Do. |
| D | N'-carbothioethoxy-6-nitroindazole | 100 | 100 | Do. |

EXAMPLE 44

A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| Aqueous solution containing 55% by weight of polyvinyl acetate | 350 |

To samples of this paint were added various amounts of N'-subsituted-6-nitroindazoles. These samples were evaluated by the following procedure: Pieces of drawn-down paper were dipped into each of the treated paints, dried for 24 hours, and again dipped into the paint. After a 24-hour drying period the coated paper samples were cut into 1¼" squares. Each of the coated paper squares was placed on a plate of agar which had previously been inoculated with 1 ml. of the test organism. The plates were incubated at 28° C. The plates inoculated with fungi were observed after 7 days; those inoculated with bacteria were observed after 48 hours. The following results were obtained:

| | Biocide | Fungi | | | | Bacteria | | | |
|---|---|---|---|---|---|---|---|---|---|
| | | A | B | C | D | E | F | G | H |
| | | Active at percent of— | | | | Active at percent of— | | | |
| A | N'-trichloromethylmercapto-6-nitroindazole | 0.1 | 0.1 | 0.1 | 0.1 | 2 | 1 | 1 | 1 |
| B | N'-trichloromethylmercapto-3-chloro-6-nitroindazole | 0.5 | 0.5 | 0.1 | 2 | (¹) | 1 | 1 | 0.5 |
| C | N'-hydroxymethyl-6-nitroindazole | 1 | 2 | 2 | 2 | (¹) | 1 | 1 | 0.5 |
| D | N'-hydroxymethyl-3-chloro-6-nitroindazole | 1 | 1 | 2 | 2 | (¹) | 1 | 1 | 0.5 |
| E | N'-chloromethyl-6-nitroindazole | | | | | (¹) | 0.5 | 0.5 | 0.5 |
| F | N'-chloromethyl-3-chloro-6-nitroindazole | | | | | 2 | 0.5 | 0.5 | 0.5 |

¹ Inactive.

NOTE.—A=*A. niger*, B=*P. crustosum*; C=*P. pullulans*; D=*A. oryzae*; E=*P. aeruginosa*; F=*A. aerogenes*; G=*B. substilis*; H=*F. flavescens*.

EXAMPLE 45

A series of tests was carried out in which N'-substituted-6-nitroindazoles were evaluated as herbicides. In these tests a group of flats containing seedlings of various plant species was sprayed with an aqueous solution prepared according to the procedure of Example 39. The results of the tests were observed 14 days after the application of the test compounds and are reported in the table that follows. In this table a rating of "0" indicates no effect; "1" to "3" indicates slight injury, "4" to "6" indicates moderate injury, "7" to "9" indicates severe injury, and "10" indicates that all plants were killed.

| Example Number | Herbicide | Dosage, lbs./acre | Clover | Sugar beets | Soybean | Corn | Wheat | Oats | Mustard | Morning glory | Buckwheat | Crabgrass | Foxtail |
|---|---|---|---|---|---|---|---|---|---|---|---|---|---|
| A | N'-(3,4-dichlorobenzoyl)-6-nitroindazole | 10 | 10 | 9 | 9 | 5 | 4 | 5 | 10 | 10 | 8 | 8 | 8 |
| | | 6 | 9 | 0 | 8 | 2 | 2 | 4 | 10 | 8 | 8 | 0 | 0 |
| | | 3 | 0 | 0 | 5 | 0 | 0 | 2 | 0 | 4 | 0 | 0 | 0 |
| B | N'-hydroxymethyl-6-nitroindazole | 10 | 8 | 10 | 5 | 6 | | 5 | 10 | 9 | 8 | 4 | 8 |
| | | 5 | 2 | 8 | 9 | 4 | | 0 | 8 | 8 | 5 | 5 | 0 |
| | | 2.5 | 0 | 3 | 4 | 1 | | 0 | 5 | 3 | 5 | 2 | 0 |
| C | N'-hydroxymethyl-3-chloro-6-nitroindazole | 10 | 4 | 10 | 8 | 7 | 4 | 5 | 9 | 7 | 9 | 3 | 2 |
| D | N'-chloroacetoxymethyl-6-nitroindazole | 10 | 2 | 6 | 4 | 4 | | 4 | 5 | 8 | 5 | 0 | 1 |
| E | N'-chloromethyl-6-nitroindazole | 10 | 10 | 10 | 8 | 6 | 6 | 6 | 10 | 8 | 10 | 10 | 10 |
| | | 5 | 9 | 10 | 8 | 5 | 6 | 6 | 10 | 9 | 7 | 10 | 10 |
| | | 2.5 | 2 | 10 | 7 | 3 | 5 | 6 | 7 | 5 | 5 | 9 | 3 |
| F | N'-chloroacetyl-6-nitroindazole | 10 | 5 | 9 | 9 | 4 | 3 | 4 | 9 | 7 | 6 | 5 | 3 |

EXAMPLE 46

In a series of experiments in which an N'-substituted-6-nitroindazole was applied at the rate of 1000 p.p.m. to plants infested with Mexican bean beetle or 2-spotted spider mite, the following results were obtained:

| Example Number | Biocide | Percent control of insect | | Phytotoxicity |
|---|---|---|---|---|
| | | Mexican bean beetle | 2-spotted spider mite | |
| A | N'-thiocyanatomethyl-6-nitroindazole | 53 | 30 | None. |
| B | N'-carbothioethoxy-6-nitroindazole | 60 | 20 | Do. |
| C | N'-carbothioethoxy-3-chloro-6-nitroindazole | 40 | 23 | Do. |
| D | N'-chloroacetyl-6-nitroindazole | 20 | 31 | Do. |
| E | N'-trichloromethylmercapto-3-chloro-6-nitroindazole | 33 | 40 | Do. |

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

I claim:
1. N'-Thiocyanatomethyl-6-nitroindazole.
2. N'-Chloromethyl-3-chloro-6-nitroindazole.

References Cited

Pozharskii et al., Jour. Gen. Chem., vol. 34, pp. 3409–11 (1964).

Pozharskii et al., Chem. Abst., vol. 61, column 14658 (1964).

Auwers et al., Ann., vol. 451, pp. 282–3 and 295–302, relied on (1927).

Borsch et al., Ann., vol. 510, pp. 287–97 (1934).

Davies, Jour. Chem. Soc. (London), 1955, 2412–23.

Martsokha et al., Chem. Abst., vol. 61, column 1849–50 (1964).

Pozharskii et al., Zhur. Obshch. Khim., vol. 34, pp. 3367–70 (1964).

NATALIE TROUSOF, Primary Examiner

U.S. Cl. X.R.

71—92; 424—273